United States Patent [19]

Kato et al.

[11] Patent Number: 4,831,891
[45] Date of Patent: May 23, 1989

[54] POWER TRANSMISSION DEVICE FOR A TRACTOR

[75] Inventors: Yukio Kato, Tokyo; Sadanori Nishimura, Saitama; Yuji Kishizawa, Saitama, all of Japan

[73] Assignee: Honda Giken Kogyo Kabushiki Kaisha, Tokyo, Japan

[21] Appl. No.: 50,991

[22] Filed: May 15, 1987

[30] Foreign Application Priority Data

| May 16, 1986 | [JP] | Japan | 61-072572 |
|---|---|---|---|
| Jul. 30, 1986 | [JP] | Japan | 61-177765 |
| Jul. 30, 1986 | [JP] | Japan | 61-177766 |
| Jul. 30, 1986 | [JP] | Japan | 61-177767 |
| Jul. 30, 1986 | [JP] | Japan | 61-116001 |

[51] Int. Cl.$^4$ .......................... F16H 3/02; F16H 37/08
[52] U.S. Cl. ................................... 74/745; 74/700; 74/15.66; 172/7; 172/75
[58] Field of Search ............. 74/700, 701, 745, 15.66, 74/15.4; 172/7, 75, 79

[56] References Cited

U.S. PATENT DOCUMENTS

| 1,961,809 | 6/1934 | Wood | 74/15.66 X |
|---|---|---|---|
| 1,982,727 | 12/1934 | Eberhard | 74/15.66 |
| 2,034,778 | 3/1936 | Storey | 74/700 |
| 2,105,742 | 1/1938 | Lee | 74/700 |
| 2,306,902 | 12/1942 | Rabe | 172/75 |
| 2,347,882 | 5/1944 | Choate et al. | 74/745 |
| 2,459,705 | 1/1949 | Julien | 74/700 |
| 2,506,671 | 5/1950 | Jacobi | 74/700 |
| 2,821,868 | 2/1958 | Gregory | 74/745 |
| 2,844,973 | 7/1958 | Hill | 74/700 |
| 4,141,424 | 2/1979 | Murayama et al. | 74/15.4 X |
| 4,203,498 | 5/1980 | Kodama | 74/745 X |
| 4,252,031 | 2/1981 | Nishimura et al. | 74/360 |
| 4,294,130 | 10/1981 | Kisaka et al. | 74/15.4 |
| 4,418,758 | 12/1983 | Fujimoto | 172/7 |

FOREIGN PATENT DOCUMENTS

| 526999 | 3/1954 | Belgium | 74/745 |
|---|---|---|---|
| 548331 | 6/1956 | Belgium | 74/745 |
| 1111694 | 11/1955 | France | 74/700 |
| 46-21138 | 6/1971 | Japan . | |
| 47-27295 | 8/1972 | Japan . | |
| 53-50984 | 12/1978 | Japan . | |
| 54-42561 | 4/1979 | Japan . | |
| 57-109022 | 7/1982 | Japan . | |
| 59-160623 | 9/1984 | Japan . | |
| 61-81819 | 4/1986 | Japan . | |
| 787836 | 12/1957 | United Kingdom | 74/15.66 |

Primary Examiner—Dirk Wright
Attorney, Agent, or Firm—Lyon & Lyon

[57] ABSTRACT

A power transmission device for a tractor in which a main shifting device and a secondary shifting device are disposed in front and back of one another within a transmission case which is mounted on a rear part of the tractor body is disclosed. Drive power, which is transmitted from an engine, is changed in speed by the main shifting device and secondary shifting device and then transmitted to an axle through a differential shaft. The differential shaft is disposed between the main shifting device and secondary shifting device. A lower link for connecting a piece of agricultural machinery is pivotably connected to the transmission case on the side of the secondary shifting device and behind the differential shaft. Various shafts within the transmission case are arranged on two different vertical level above and below the differential shaft, which extends at right angles with respect to these shafts. The differential shaft is connected to the axle through a reduction gear apparatus which has a counter-shaft. Furthermore, a brake device for braking the differential shaft is provided.

5 Claims, 8 Drawing Sheets

POWER TRANSMISSION DEVICE FOR A TRACTOR

BACKGROUND OF THE INVENTION

This invention relates to a power transmission device for an agricultural tractor.

Figure 1:
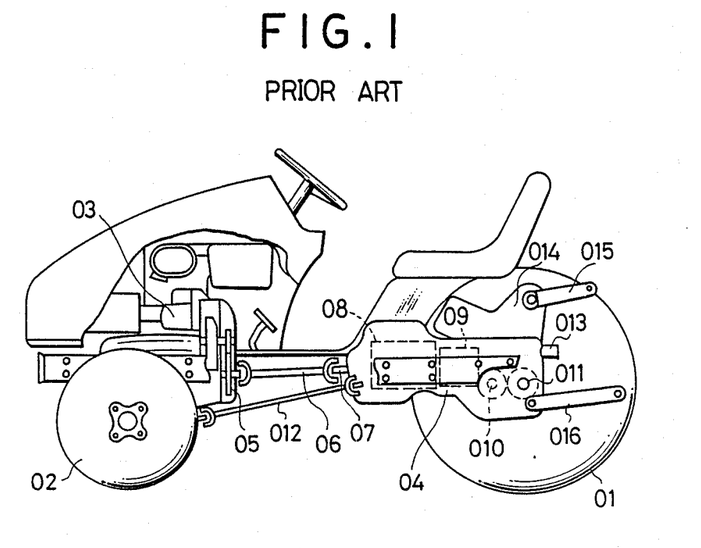
FIG. 1 is a cutaway side view of a conventional tractor.

In an agricultural tractor, the engine is usually mounted on its front portion of the body and a transmission case is usually mounted on the rear portion. FIG. 1 is a side view showing such a conventional agricultural tractor, in which 01 denotes a rear wheel and 02 denotes a front wheel. The front part of the tractor body is provided with an engine 03 and the rear part thereof is provided with a transmission case 04. The main shaft of the engine 03 is connected to a propeller shaft 06 through a reduction gear 05. The propeller shaft 06 extends backwards along the bottom of the tractor body and is connected to an input shaft 07 of the transmission case 04.

A main shifting device 08 and a secondary shifting device 09 are provided within the transmission case 04 in the front and back thereof, respectively. Engine power is transmitted by the input shaft 07 to a differential shaft 010 through a differential apparatus with an accompanying increase or decrease in rotational speed and further to a rear axle 011 through a final reduction gear. The power, which passes through the main and secondary shifting devices 08 and 09, is also transmitted to the front wheel 02 through a front-wheel drive propeller shaft 012. Furthermore, the engine power, which is input to the input shaft 07, is properly changed in speed and then transmitted to a PTO shaft 013. The PTO shaft 013 transmits power to a piece of agricultural machinery such as a rotary machine which is connected to a rear part of the tractor.

The agricultural machinery is connected to the tractor through a lifting arm 015 which is pivotably supported by a hydraulic cylinder 014 which is mounted on the upper portion of the transmission case 04 and is vertically swung in association with the movement of a piston of the hydraulic cylinder and a lower arm 016 which is pivotably supported by the side of the transmission case 04 and is lifted up and down by the hydraulic cylinder 014.

In such a conventional tractor, since the differential shaft 010 and rear axle 011 are disposed to the rear of the secondary shifting device 09, the length of the transmission case 04 in the longitudinal direction is increased by that amount. Furthermore, since the lower arm 016 must be connected to the side wall of the transmission case 04 to the rear position of the differential shaft 010 so that the lower arm 016 will not interfere, when it is swung vertically, with the differential shaft 010 which extends from the side wall of the transmission case 04, the agricultural machinery ends up being separated too far from the body of the tractor. Accordingly, when performing plowing, for example, the area which is left unplowed is comparatively large, and it is necessary to make another pass through a field to plow those areas which were missed.

Japanese Utility Model Laid-Open Publication No. 47-27295 discloses a transmission device for a tractor in which a differential apparatus is disposed between a main shifting device and a secondary shifting device. In this transmission device, three shafts are disposed in three stages, one in an upper stage, the second in an intermediate stage, and the third in a lower stage. Both end portions of an upper shaft and a lower shaft, which extend in the longitudinal direction through the transmission case, are provided with a shifting gear. Accordingly, the height of the transmission case becomes large over its entire length from its front to its rear. As a result, the seat, which is disposed above the transmission case, must also be high due to the height of the transmission case. Furthermore, in this device, a PTO shaft, which must be disposed at a predetermined height in relation with a piece of agricultural machinery, is disposed in a lower part of the transmission case. Accordingly, the transmission case must be placed in a high position due to the height of this PTO shaft. As a result, the height of the seat is still further increased.

Furthermore, in the tractor, a brake apparatus is interposed between a differential shaft and a rear axle on both sides of the tractor body, and the tractor body is able to turn by separately actuating these brake apparatuses. This brake apparatus, as disclosed, for example, in Japanese Patent Laid-Open Publication No. 59-160623 and Japanese Utility Model Laid-Open Publication No. 53-50984, is provided on the outer wall of the transmission case, and foreign matter such as mud, and rain drops can easily enter into the brake apparatus.

SUMMARY OF THE INVENTION

An object of the present invention is to provide a power transmission device for a tractor, in which the length of a transmission case is short and the length of a projection of a lower arm projecting from a rear end of the transmission case is also short.

Another object of the present invention is to provide a power transmission device for a tractor, in which the height of the seat is lowered by making the height of the upper portion of the transmission case as low as possible while the height from the ground of the lower part of the transmission case is made sufficiently high.

A further object of the present invention is to provide a power transmission device for a tractor, in which the arrangement of a main shifting device, a secondary shifting device and a differential apparatus is improved within the transmission case to make them compact.

A still further object of the present invention is to provide a power transmission device for a tractor, in which a reduction gear having a large reduction gear ratio and a brake apparatus are compactly disposed between a differential shaft and an axle.

In order to achieve the above objects, according to the present invention, in a power transmission device for a tractor, a main shifting device and a secondary shifting device are arranged in front and back of one another within a transmission case mounted on a rear part of a vehicle body, and after drive power transmitted from an engine is changed in speed by the main shifting device and secondary shifting device, the power is transmitted to an axle through a differential shaft, the differential shaft being disposed between the main shifting device and secondary shifting device, a lower link for connecting a piece of machinery being pivotably connected to the transmission case on the side of the secondary shifting device and behind the differential shaft.

The main shifting device includes a first main shifting shaft which extends in the longitudinal direction as far as the secondary shifting device, and a second main shifting shaft which is disposed in parallel with the first main shifting shaft. A front-wheel drive shaft extends from the secondary shifting device to the front end of the transmission case. A PTO shaft extends from the front part of the transmission case to the rear part thereof. The differential shaft extends perpendicular to the aforementioned various shafts between the main shifting shaft and the secondary shifting shaft. The first main shifting shaft, the second main shifting shaft, and the front-wheel drive shaft are disposed under the differential shaft, and the PTO shaft is disposed above the differential shaft. A shifting gear for transmitting the rotation to the PTO shaft is disposed on the main shifting device side.

A differential device is disposed adjacent to the side wall of the transmission case which is on an input ring gear side. The end portion of the shifting shaft provided in at least one of the main and secondary shifting devices extends into a space formed on the other side of the transmission case in such a manner as to overlap with the input ring-gear when viewed from the side.

According to the present invention, there is also provided a wheel drive structure for a tractor in which the output of the engine is further reduced in speed after it passes through the differential shaft and is transmitted to the axle. This wheel drive structure includes a reduction gear train disposed between a differential shaft and an axle which is spaced apart in the longitudinal direction from and is parallel with the differential shaft, a wet multi-disc brake mounted on an outer end portion of the differential shaft, a partition wall for partitioning the space between the wet multi-disc brake and the reduction gear train and for receiving brake reaction, and a brake housing which is secured to a transmission side wall together with the partition wall and which defines a brake chamber in cooperation with the partition wall.

DETAILED DESCRIPTION OF THE PREFERRED EMBODIMENTS

Figure 2:
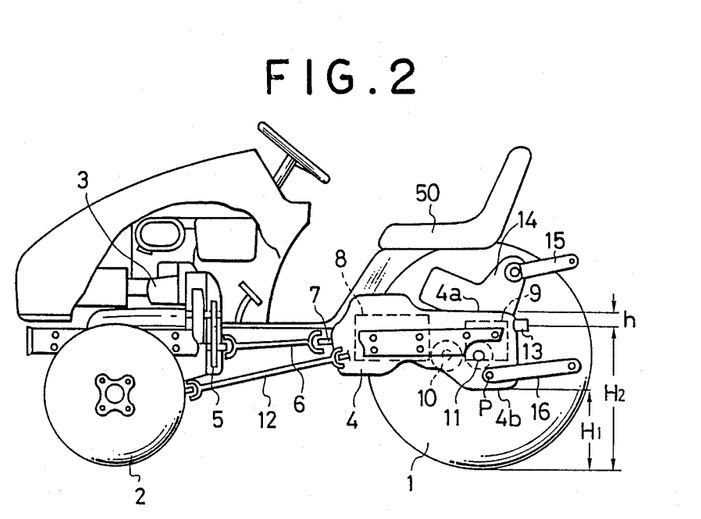
FIG. 2 is a cutaway side view of the present invention.

FIG. 2 is a cutaway side view similar to FIG. 1 showing the overall structure of the present invention. A comparison of FIGS. 1 and 2 reveals that, according to the present invention, the connecting point P of a lower arm 16 with respect to a transmission case 4 can be placed closer to the front of the transmission case 4 by arranging a differential shaft 10 between a main shifting device 8 and a secondary shifting device 9. Accordingly, the length of the part of the lower arm 16 which projects from the rear end of the transmission case 4 is reduced. Furthermore, since the connecting point P and a rear axle 11 are arranged in a position where they overlap with the secondary shifting device 9 when viewed from the side, the length of the transmission case 4 is also shortened. In FIG. 2, the same parts as in FIG. 1 are denoted by the same reference numbers except that the first 0 is removed therefrom.

Figure 3:
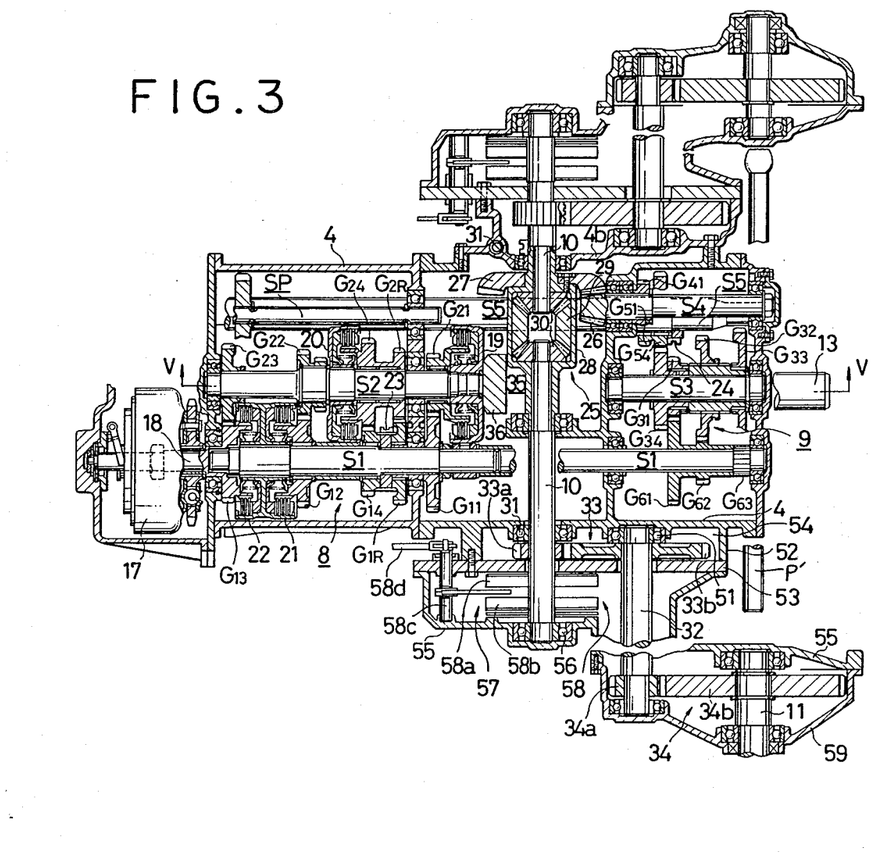
FIG. 3 is a horizontal sectional view showing a power transmission device for a tractor according to the present invention.
Figure 4:
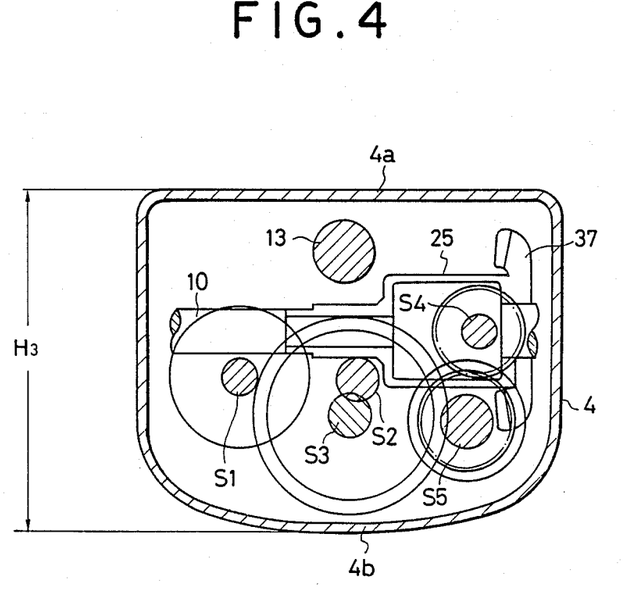
FIG. 4 is a vertical sectional view showing somewhat schematically the positional relationship among the various shafts arranged within the transmission case.

FIG. 3 is a horizontal sectional view showing a power transmission device within the transmission case 4. The members P' shown in this figure function as the pivot members for the lower arm 16 which, together with the lifting arm 15, operate in the same manner as previously described in connection with the arms 015 and 016 of FIG. 1. FIG. 4 is a vertical sectional view showing the positional relationship of various shafts which are arranged within the transmission case 4 as seen looking from the rear to the front of the transmission case 4. As is apparent from these figures, a first main shifting shaft S1 is arranged on the left side within the transmission case 4 and extends from the front end portion to the rear end portion. A second main shifting shaft S2 is disposed to the front of the midportion of the transmission case 4, while a secondary main shifting shaft S3 is disposed to the rear thereof. A PTO shaft 13 extends above the second main shifting shaft S2 and secondary shifting shaft S3 from the front portion to the rear of the transmission case. The rear part of the PTO shaft 13 extends backwards from the transmission case 4. Arranged on the right side within the transmission case 4 is a rear wheel drive shaft S4 which is disposed in the rear of and midway up the height of the transmission case, while a front-wheel drive shaft S5 is disposed thereunder. The front-wheel drive shaft S5 extends as far as the front end portion of the transmission case 4 and is connected to a front-wheel drive propeller shaft 12 (see FIG. 2). The differential shaft 10 is disposed above the first main shifting shaft S1 and front-wheel drive shaft S5 and under the PTO shaft, transversing these shafts at right angles. SP denotes a pump shaft for driving a hydraulic pump for clutch actuating oil and lubricating oil. These shaft$ extend in the longitudinal direction in parallel with one another.

Numeral 17 denotes a main clutch. Engine power is transmitted from the input shaft (see FIG. 2) to this main clutch 17 and is input to the transmission case 4 via the main clutch shaft 18. The main clutch shaft 18 is rotatably supported by the transmission case 4 by means of a ball bearing. The front end of the first main shifting shaft S1 is rotatably supported by the rear end of this main clutch shaft 18 by means of a needle bearing. The rear end portion of the main clutch shaft 18 is integral with a gear $G_{13}$. Gear $G_{13}$ always meshes with another gear $G_{23}$ which is secured to the second main shifting shaft S2. Accordingly, when the main clutch 17 is engaged, the second main shifting shaft S2 is always driven and rotated by the engine. A main shifting device 8 for transmitting this rotation to the first main shifting shaft S1 after changing its speed is disposed between both of the main shifting shafts. The main shifting device 8 includes a first speed hydraulic shifting clutch 19 and a fourth speed and reverse hydraulic shifting clutch 20 which are secured to the second main shifting shaft S2, and a second speed hydraulic shifting clutch 21 and a three speed hydraulic shifting clutch 22 which are secured to the first main shifting shaft Sl. When the first speed hydraulic shifting clutch 19 is engaged, rotation of the second shifting shaft S2 is transmitted to the first main shifting shaft S1 through gears $G_{21}$ and $G_{11}$. On the other hand, when the fourth speed and reverse hydraulic shifting clutch 20 is engaged, the rotation of the second main shifting shaft S2 is transmitted to the first main shifting shaft S1 through gears $G_{2R}$ and $G_{1R}$ depending on the axial position of a selector 23. Between gears $G_{2R}$ and $G_{1R}$, an unillustrated idle gear is disposed. When the transmission is performed through these gears, the first main shifting shaft S1 is rotated in the reverse direction. When the second speed hydraulic clutch 21 is engaged, the rotation of the second main shifting shaft S2 is transmitted to the first main shifting shaft S1 through gears $G_{22}$ and $G_{12}$. When the third speed hydraulic shifting clutch 22 is engaged, gear $G_{13}$ is connected to the first main shifting shaft S1 and the first main shifting shaft S1 is directly driven by the main clutch shaft 18 and not through the second main shifting shaft S2.

In this way, five stage shifting, i.e. shifting among forward four speeds and one reverse speed, is selectively performed in the main shifting device 8. The engine rotation, which was changed in speed, is transmitted to a rear secondary shifting device 9 through the first main shifting shaft Sl. The secondary shifting device 9 is disposed to the rear of the first main shifting shaft S1 and the secondary shifting shaft S3. The secondary shifting device 9 comprises a gear $G_{61}$, a gear $G_{62}$ and a gear $G_{63}$ which are secured to the first main shifting shaft S1, a gear $G_{31}$ which meshes with the gear $G_{61}$ which is rotatably supported by the secondary shifting shaft S3 by means of a needle bearing, a gear $G_{33}$ which meshes with gear $G_{63}$ and which is likewise rotatably supported by the secondary shifting shaft S3, and a gear $G_{32}$ which is spline-engaged with the secondary shifting shaft S3 and can slide in the longitudinal direction, between a front and rear position, and which is able to detachably engage with gear $G_{62}$ and which connects gear $G_{31}$ to the secondary shifting shaft S3 when in its forward position and connects gear $G_{33}$ to the secondary shifting shaft S3 when in its rear position. Accordingly, the rotation is transmitted from the first main shifting shaft S1 to the secondary shifting shaft S3 using three different gear ratios depending on the sliding position of gear $G_{32}$, thus permitting the main shifting device 8 and the secondary shifting device 9 to perform the gear changing among twelve forward speeds and three reverse speeds.

The secondary shifting shaft S3 has a gear $G_{34}$ secured thereto. Gear $G_{34}$ meshes with a gear $G_{54}$. Gear $G_{54}$ loosely fits on the front-wheel drive shaft S5. However, gear $G_{54}$ is able to engage with and disengage from the front-wheel drive shaft S5 by a selector 24 and is also able to drive the front wheels through the front-wheel drive shaft S5 when necessary. Gear $G_{54}$ is integral with a gear $G_{51}$ which meshes with a gear $G_{41}$ which is secured to the rear-wheel drive shaft S4.

A differential apparatus 25 is disposed between the main shifting device 8 and the secondary shifting device 9. A small bevel gear 26 mounted on the front end of the rearwheel drive shaft S4 meshes with a large bevel gear 27 (input ring gear) of the differential apparatus 25. Engine rotation, which is transmitted to the large bevel gear 27, is transmitted to differential shafts 10 on both sides of the differential apparatus 25 through a differential case 28, a differential pinion 29, and a differential side gear 30 in a conventional manner. The differential shafts 10 are rotatably supported by the side walls of the transmission case 4 by means of a ball bearing 31 and extend laterally through the side walls of the transmission case 4. The rotation of the differential shaft 10 is reduced in speed in two stages by reduction gear trains 33 and 34 through an intermediate shaft 32 and is then transmitted to the rear axle 11.

Figure 5:
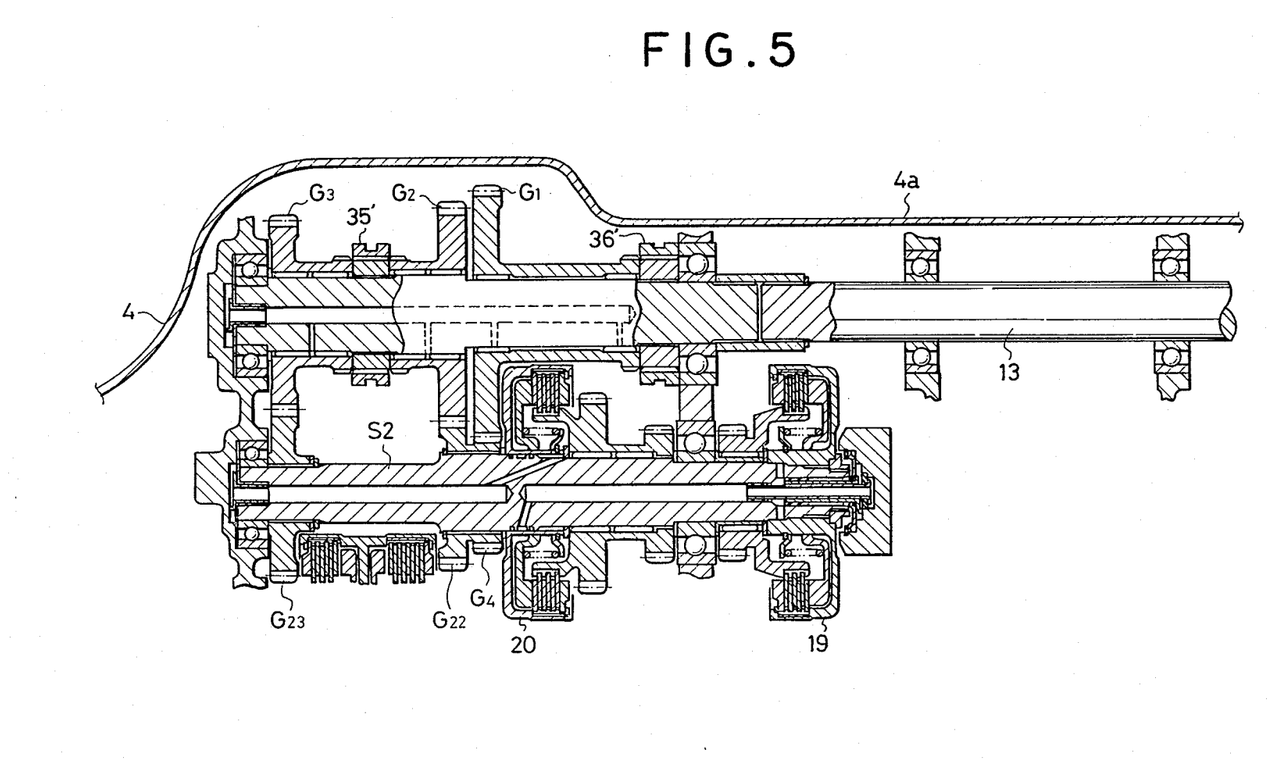
FIG. 5 is an enlarged sectional view taken along Line V—V of FIG. 3.

The PTO shaft 13, as described before, extends above the second main shifting shaft S2 in the longitudinal direction over the length of the second main shifting shaft S2 and secondary shifting shaft S3. As shown in FIG. 5, the front part of the PTO shaft 13 is connected to the second main shifting shaft S2 through a shifting gear group. More specifically, the front end portion of the PTO shaft 13 rotatably supports a gear $G_3$ and a gear $G_2$ by means of a needle bearing. These gears are selectively engaged with the PTO shaft 13 by sliding a selector 35' in one of two directions. Gear $G_3$ meshes with gear $G_{23}$ which is secured to the second main shifting shaft S2. On the other hand, gear $G_2$ likewise meshes with a gear $G_{22}$ which is secured to the second main shifting shaft S2. Behind gear $G_2$, a gear $G_1$ is rotatably supported. This gear $G_1$ meshes with a gear $G_4$ which is integral with gear $G_{22}$ and is selectively engaged with the PTO shaft 13 through a selector 36'.

By virtue of the above-mentioned constitution, rotation is transmitted from the second main shifting shaft S2 to the PTO shaft 13 at three different gear ratios. However, gears $G_3$, $G_2$ and $G_1$, which project upwards from the PTO shaft 13, are all disposed on the front portion of the PTO shaft 13 and no gears or other projecting members are disposed on the rear portion thereof. Since the PTO shaft 13 is disposed in the uppermost portion of the transmission case 4, the rear portion 4a of the upper wall of the transmission case 4 can be lowered so that there is but a small clearance between it and the PTO shaft 13 as shown in FIG. 4 and FIG. 2. Furthermore, by mounting a hydraulic cylinder 14 on the upper surface of the upper wall 4a, since the upper wall 4a is low, the height of the upper portion of the hydraulic cylinder 14 is also low. Accordingly, a seat 50, which is located above the upper portion of the hydraulic cylinder, can be placed in a conveniently low position.

The height $H_2$ (see FIG. 2) of the PTO shaft 13 from the ground is fixed because of its relation with the agricultural machinery. Accordingly, this height cannot be lowered. Since the PTO shaft 13 is disposed in the uppermost portion of the transmission case in this embodiment, the difference h between the upper surface of the case 4 and the fixed height $H_2$ becomes small, and the upper surface of the case 4 can be made so low as possible.

Furthermore, in this embodiment, the first main shifting shaft S1, the second main shifting shaft S2, the secondary shifting shaft S3, and the front-wheel drive shaft S5 are disposed at generally the same height and a parallel with one another, extending from left to right under the differential shaft 10. Accordingly, the width of the transmission case 4 becomes somewhat wide. However, since the height $H_3$ (see FIG. 4) of the transmission case 4 becomes short, the height $H_1$ of the bottom wall 4b above the ground can be made high so as to prevent the transmission case 4 from striking bumps in the ground or other obstacles.

The differential apparatus 25 is off-center and is closer to the right side wall 4b of the transmission case 4, lying between the main shifting device 8 and the secondary shifting device 9. The large bevel gear 27, which inputs the engine rotation to the differential apparatus 25, is disposed between the main portion of the differential apparatus 25 and the side wall 4b. As a result, a comparatively large space 35 is formed on the left side of the differential apparatus 25, i.e., at the center of the transmission case 4. The rear end portion of the second main shifting shaft S2 enters this space 35, and the rear end portion and the large bevel gear 27 overlap with each other when viewed from the side. Furthermore, a stationary wall portion 36, which is rigidly secured to the transmission case 4, is disposed within this space 35. The rear end portion of the second main shifting shaft S2 contacts and rotates with respect to the stationary wall portion 36.

Figure 6:
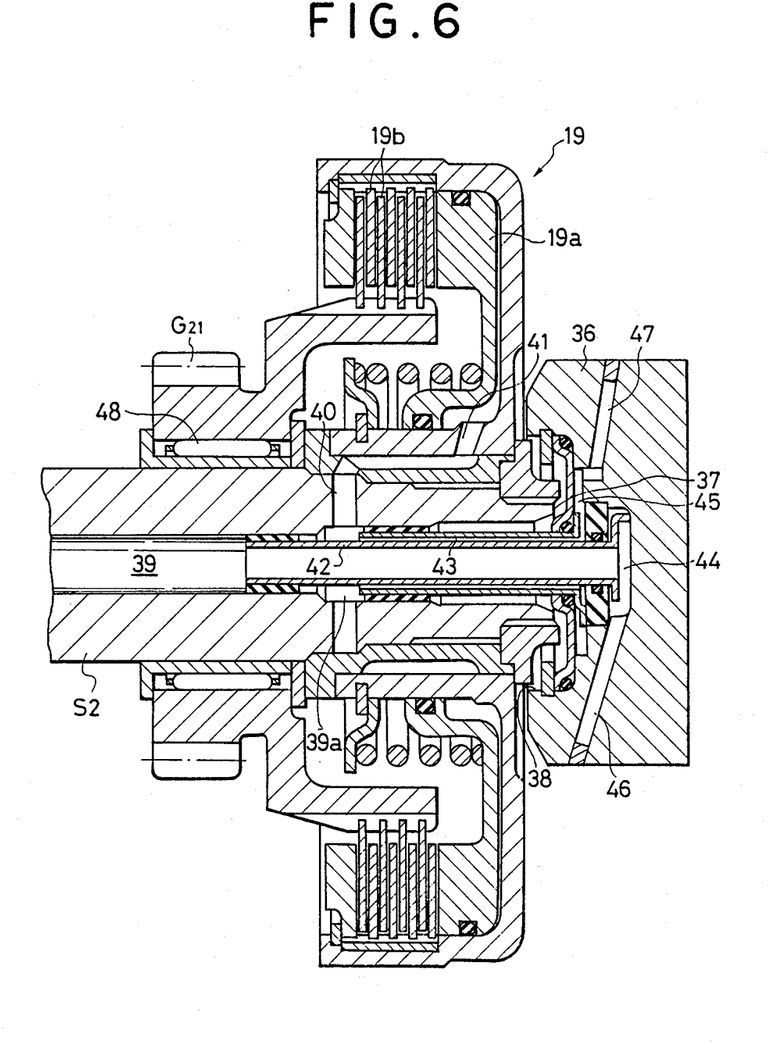
FIG. 6 is an enlarged view of a portion of FIG. 3.

More specifically, as shown in FIG. 6, the end face 37 of the second main shifting shaft S2 enters into a recess 38 formed in the stationary wall portion 36 and confronts the bottom surface of the recess 38. Formed in the second main shifting shaft S2 is an oil passage 39 which extends from the end face 37 in the axial direction. The rear end of the oil passage 39 has a large diameter portion 39a formed therein. The large diameter portion 39a communicates with an oil passage 40 formed in the radial direction which in turn communicates with an oil passage 41 of the first speed hydraulic shifting clutch numeral 19. 19a denotes an actuating member of the first speed hydraulic shifting clutch 19, which is actuated by a working oil which is supplied through the oil passage 41 to press the clutch plates 19b against one another. Due to the above-described construction, the rotation of the second main shifting shaft S2 is transmitted to gear $G_{21}$ through the first speed hydraulic shifting clutch 19. The front end of the oil passage 39 likewise communicates with the fourth speed and reverse hydraulic shifting clutch 20. Double inner and outer tubular members 42 and 43 are coaxially disposed and separated from one another in the radial direction. They fit into the opening at the rear end of the oil passage 39 and are coaxially disposed with respect to the oil passage 39. The inner tubular member 42 is inserted into the oil passage 39 past the large diameter portion 39a. The space between its front end and the inner wall of the oil passage 39 is sealed with a sealing member. The outer tubular member 43 extends as far as the midway of the large diameter portion 39a. The space between its front end and the large diameter portion 39a is also sealed with another sealing member. The rear end portions of the tubular members 42 and 43 are rotatably supported by the stationary wall portion 36.

The stationary wall portion 36 has a first oil supply port 44 formed therein which communicates with the interior of tubular member 42, and a second oil supply port 45 which communicates with n annular passage formed between tubular member 42 and tubular member 43, there being no communication between the first and second oil supply ports 44 and 45. These oil supply ports 44 and 45 communicates with a hydraulic pump through oil passages 46 and 47, respectively. When a gear shifting operation is performed in order to actuate the first speed hydraulic shifting clutch 19, oil which is discharged from the hydraulic pump is supplied to the oil supply port 45 through the oil passage 47 and transferred to the first speed hydraulic shifting clutch 19 via the annular passage between the tubular members 42 and 43, the large diameter portion 39a of oil passage 39, oil passage 40, and oil passage 41. On the other hand, when gear shifting operation is performed in order to actuate the fourth speed and reverse hydraulic shifting clutch 20, working oil is supplied to the fourth speed and reverse hydraulic shifting clutch 20 via oil passage 46, the oil supply port 44, tubular member 42, and oil passage 39. Although oil passages 39 and 40 are formed as oil passages for supplying working oil to the hydraulic shifting clutch in this embodiment, they may of course be formed as oil passages for supplying lubricating oil to a lubricating portion such as the needle bearing 48 shown in FIG. 6.

In this embodiment, since the rear end portion of the second main shifting shaft S2 enters the space 35 produced by disposing the differential apparatus 25 in such a manner as to be closer to one side wall 4b of the transmission case 4 than to the other as mentioned previously, the main shifting device 8 and the secondary shifting device 9 are brought closer to one another to the extent that the rear end portion enters the space 35. Thus, the transmission case 4 is made compact and is short in the longitudinal direction. Furthermore, since the stationary wall portion 36 is disposed in the space 35 and working oil or lubricating oil is supplied to the second main shifting shaft S2 through oil passages 46 and 47 which are formed in the stationary wall portion 36, the hydraulic piping which extends from the hydraulic pump around the second main shifting shaft S2 can be simplified.

In addition to the second main shifting shaft S2, the front end portion of the secondary shifting shaft S3 on the secondary shifting device 9 side may enter the space 35 so that the transmission case 4 is made shorter.

Behind the differential shaft 10 which projects sidewards from the transmission case 4, a counter shaft 32 is rotatably supported at one end thereof by the transmission case 4 by means of a ball bearing 51. The counter shaft 32 extends sidewards from the transmission case 4. A first reduction gear train 33, which comprises a pair of gears 33a and 33b, is disposed along the transmission case 4 between the differential shaft 10 and the counter shaft 32. The reduction gear train 33 is disposed within a reduction gear chamber 54 which is surrounded by an enclosure wall portion 52 which projects from the transmission case 4, and a wall plate 53 which is secured to the enclosure wall portion 52 in such a manner as to cover the opening thereof. The partition wall plate 53 is made of a thick pressed steel plate and has high rigidity.

The partition wall plate 53 has a brake housing 55 mounted on its outer side. The partition wall plate 53 and the brake housing 55 are together tightly secured to the enclosure wall portion 52 which extends over much of the side portion of the transmission case 4. The enclosure wall portion 52 is provided on almost the entirety of the side wall of the transmission case 4 except for the main shifting case. The differential shaft 10 extends outwards through the partition wall plate 53 and its outer end is rotatably supported by the brake housing 55 by means of a ball bearing 56. A brake apparatus 58 is provided in a brake chamber 57 which is defined by the enclosure wall plate 53 and the brake housing 55. The brake apparatus 58 includes friction disks 58a and 58b which are mounted on the differential shaft 10 so as to rotate together with the shaft 10 as one unit and slide in the axial direction with respect thereto. The differential shaft 10 is braked when these friction disks 58a and 58b are made to respectively contact the partition wall plate 53 and the brake housing 55 under pressure by a cam mechanism, etc. 58c denotes a cam actuating shaft which is connected to a brake lever through a connecting rod 58d.

The counter shaft 32 also extends outwards at the rear portion within the brake chamber 57 and penetrates the partition wall plate 53. An axle case 59 is mounted on the outer side of the rear portion of the brake housing 55 and covers an opening formed in the brake housing 55. The outer end of the counter shaft 32 is rotatably supported by the axle case 59. A rear axle 11 is disposed behind the counter shaft 32 and is rotatably supported by the brake housing 55 and the axle case 59. The rear wheels are attached to the rear axle 11. Disposed between the counter shaft 32 and the rear axle 11 is the second reduction gear train which comprises a pair of gears 34a and 34b. Rotation of the differential shaft 10 is reduced in speed in two stages and transmitted to the rear axle 11 through the first reduction gear train 33, the counter shaft 32, and the second reduction gear train 34.

As described in the foregoing, since the rotation of the differential shaft 10 is reduced in speed in two stages and transmitted to the rear axle 11 through the first reduction gear train 33, the counter shaft 32, and the second reduction gear train 34, the gear change ratio for shafts 10 and 11 can be made large. In addition, gears 33a, 33b, 34a and 34b may be of a comparatively small diameter. Furthermore, since the reduction gear chamber 54 and the brake chamber 57 are partitioned by a partition wall plate 53, oil within the transmission case 4 can not flow into the brake chamber 57 to prevent the action of the brake apparatus 58. The partition wall plate 53 forms a rigid brake chamber 57 together with the brake housing 55 and is able to resist the reaction of the brake apparatus 58 with certainty. In addition, since the partition wall plate 53 and the brake housing 55 are together secured to the transmission case 4, the brake chamber 57 can be made very easily and inexpensively.

Figure 7:
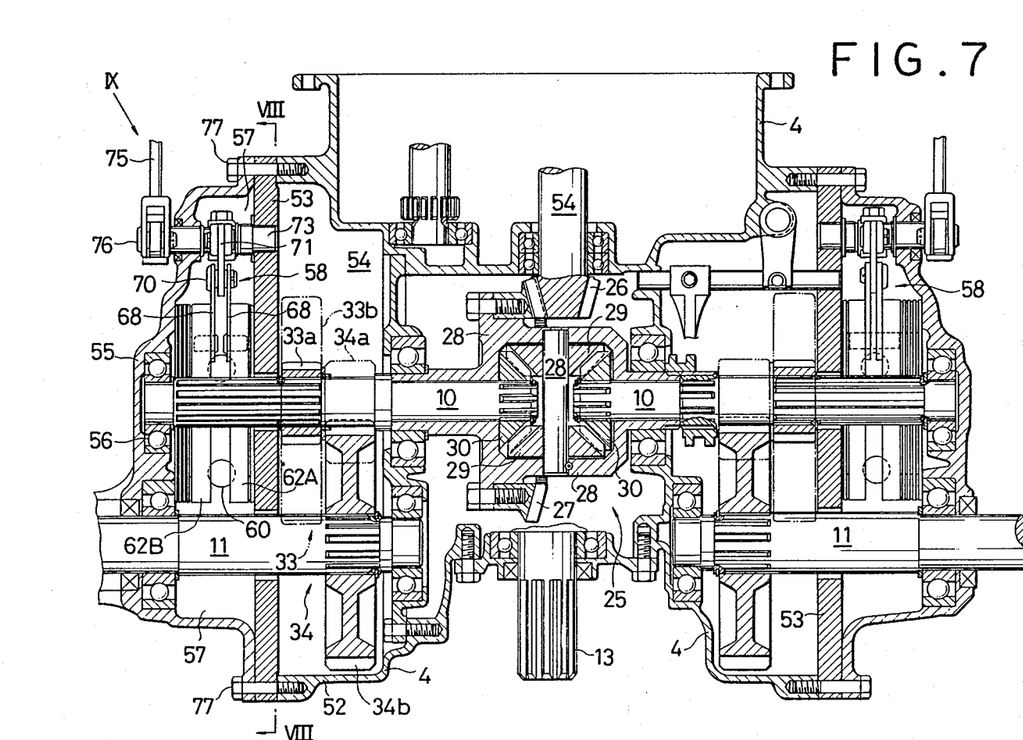
FIG. 7 is a sectional view showing another embodiment of a rear wheel drive structure.

FIG. 7 is a sectional view showing another embodiment of a rear axle drive mechanism from the differential shaft 10 to the rear axle 11. In the figure, the same parts as in the preceding embodiment are denoted by the same reference numerals. As is apparent from the figure, in this embodiment, the differential apparatus 25 is located in the most rearward portion of the transmission case 4. However, it may be arranged in the same manner as the differential device of the preceding embodiment. This embodiment is different from the preceding embodiment in that both the first reduction gear train 33 and second reduction gear train 34 are arranged within the reduction gear chamber 54.

Figure 8:
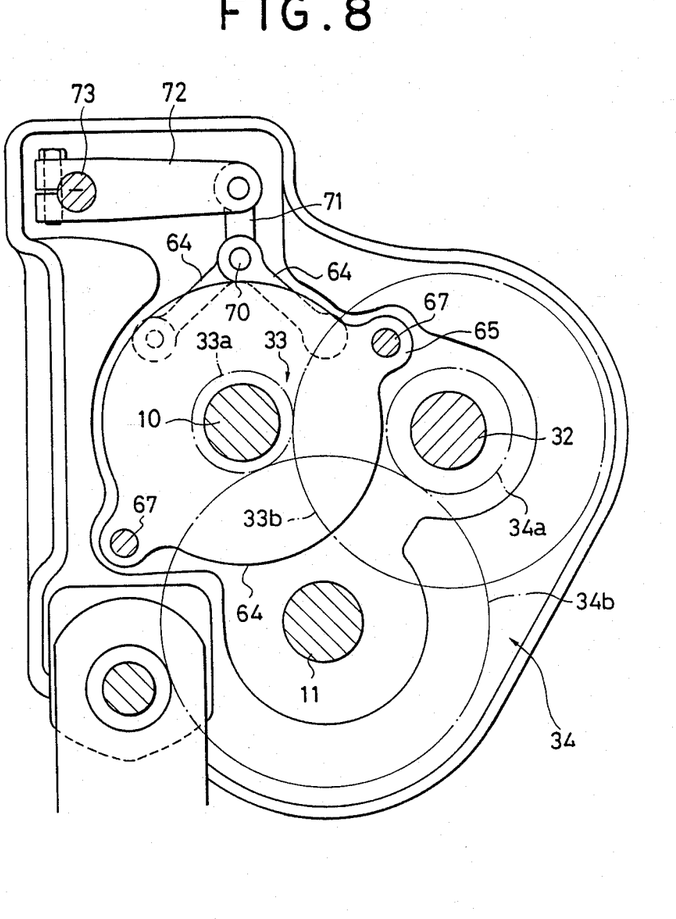
FIG. 8 is a sectional view taken along Line VIII—VIII of FIG. 7.

The rear axle drive structure of FIG. 7 will be described hereunder in detail. A differential shaft 10 extends outwards through a partition wall plate 53 and is supported by a brake housing 55 by means of a ball bearing 56. A counter shaft 32 and a rear axle 11 which penetrate the partition wall plate 53 are provided within a reduction gear chamber 54 and a brake chamber 57, the opposite ends of which are respectively supported by the side wall of the transmission case 4 and the brake housing 55 by means of a ball bearing. FIG. 8 shows the positional relationship among shafts 10, 32, and 11. A gear 33a, which is fit on the differential shaft 10, meshes with a gear 33b which is fit on the counter shaft 32. A gear 34a which is fit on the counter shaft 32, meshes with a gear 34b which is fit on the rear axle 11. These gears are contained in a gear shift chamber 54 as described previously.

Figure 9:
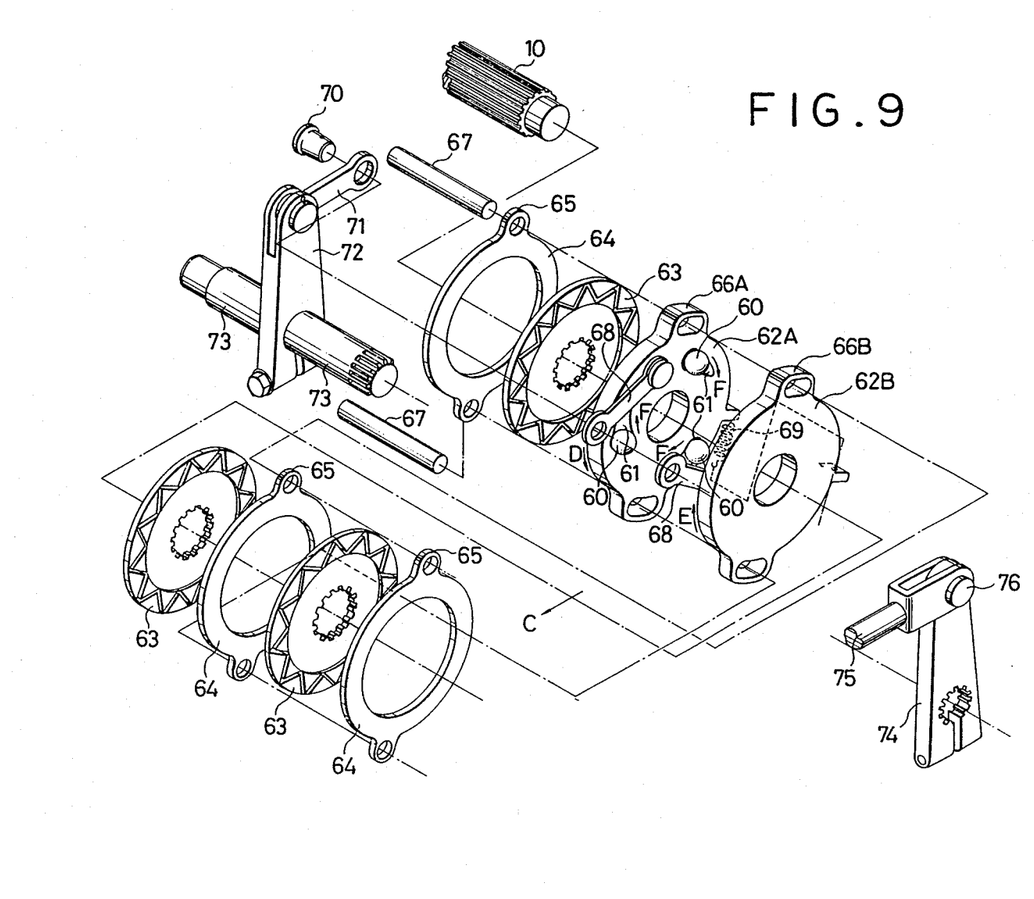
FIG. 9 is an exploded perspective view of a brake apparatus.

A wet multi-disc brake 58 is contained within a brake chamber 57. FIG. 9 is an exploded perspective view of the wet multi-disc brake 58 when viewed in the direction of arrow IX of FIG. 7.

The wet multi-disc brake 58 chiefly comprises a plurality of pressure balls 60 made of steel, a ball-controlling plate 62A having a plurality of cam grooves 61 which engage with the pressure balls 60, a ball-controlling plate 62B having a plurality of small spherical recesses which likewise engage with corresponding pressure balls 60, and a plurality of friction plates 63 and braking plates 64 which are disposed of both sides of the ball-controlling plates 62A and 62B and which hold the plates 62A and 62B therebetween. Each of these members has an opening at its center, and the differential shaft 10 passes through all of the opening. The portion of the differential shaft 10 which passes therethrough is splined, and the splines engage with corresponding grooves formed in the periphery of the openings in the centers of the friction plates 63.

Two retaining tabs 65 which project from the outer periphery of the braking plate 64 are each formed with a small opening, while a pair of retaining projections 66A and 66B, which project from the outer peripheries of the ball controlling plates 62A and 62B, are each formed with a rounded elongated opening. A pair of locking pins 67, which penetrate all of these openings, are supported at both end portions by the partition wall plate 53 and the brake housing 55. Therefore, the braking plate 64 is locked by the locking pin 67 and unable to rotate. However, the ball-controlling plates 62A and 62B are able to slightly rotate by an amount prescribed by the elongated openings. The confronting surfaces of the ball-controlling plates 62A and 62B are provided with connecting pieces 68 which are pivotably mounted thereon. When the connecting pieces 68 are pulled generally in the direction shown by arrow C of FIG. 9, the ball-controlling plates 62A and 62B are rotated in the directions shown by arrows D and E, respectively. As a result, the pressure balls 60 are displaced towards the shallow ends (arrow F) of the cam groove 61 while being caught in the small spherical recesses of ball-controlling plate 62B. As a result, the ball-controlling plates 62A and 62B, which confront each other, are moved away from one another, and the ball-controlling plates 62A and 62B, the braking plate 64, and the friction plate 63 are urged against one another under high pressure. When the tensile force on the connecting pieces 68 is released, the ball-controlling plates 62A and 62B are returned to their initial positions by a tensile coil spring 69 which connects the ball-controlling plates 62A and 62B together, and the pressure balls 60 are moved towards the deep ends of the cam grooves 61. As a result, the ball-controlling plates 62A and 62B are caused to approach one another again, and the friction plate 63, which was held between the ball-controlling plates 62A and 62B and the braking plate 64 is released.

The connecting pieces 68 are pivotally connected to one end of a connecting piece 71 through a connecting pin 70. The other end of the connecting piece 71 is pivotally attached to a first brake arm 72. The first brake arm 72 is secured, by clamping means, to a supporting shaft 73 which is rotatably supported by the partition wall 53 and brake housing 55. The outer end of the supporting shaft 73 projects outside of the brake housing 55. The outer end portion is provided with a second brake arm 74 which is secured thereto. The second brake arm 74 is pivotally connected with a brake operating rod 75 through a connecting pin 76.

When the brake operating rod 75 is operated when the tractor is moved, the connecting pieces 68 are pulled by the second brake arm 74, the first brake arm 72, and the connecting piece 71 in the direction shown by the arrow C, and the friction plate 63 is urged against the braking plate 64 as described previously. The friction plate 63 rotates together with the differential shaft 10. Since the braking plate 64 is supported by the partition wall plate 53 and the brake housing 55 by means of the locking pin 67, the differential shaft 10 is braked. The partition wall plate 53 is formed of a thick rolled-steel plate and has sufficient rigidity. Since the plate 53 is able to resist a large brake reaction, a large braking capability is obtained. In addition, since this partition wall plate 53 is merely a single plate which is tightly secured to the transmission case 4 together with the brake housing 55 by a bolt 77, an inexpensive brake apparatus having a simple structure can be obtained.

What is claimed is:

1. A power transmission device for an engine-driven tractor having a transmission case mounted in a rear part thereof, a main shifting device and a secondary shifting device arranged in front-to-back longitudinally spaced relation within said transmission case, means for lifting agricultural machinery including a lower arm vertically swingably mounted to said transmission case and a differential shaft extending transversely of said transmission case for transmitting drive power from the engine to an axle, characterized by said differential shaft being disposed between said main shifting device and said secondary shifting device, and said lower arm being pivotably connected to said transmission case adjacent said secondary shifting device and behind said differential shaft, and said power transmission apparatus further including a longitudinally-extending first main shifting shaft disposed in said main shifting device and extending to said secondary shifting device, a second main shifting shaft disposed in said main shifting device in parallel with said first main shifting shaft, a front-wheel drive shaft extending from said secondary shifting device to the front end of said transmission case, a transversely-extending differential shaft extending at right angles with respect to said first main shifting shaft and disposed between said main shifting device and said secondary shifting device, and a PTO shaft extending from the front part of said transmission case to the rear part thereof, said first main shifting shaft, said second main shifting shaft, and said front-wheel drive shaft being disposed under said differential shaft, said PTO shaft being disposed above said differential shaft, and a shifting gear for transmitting rotation to said PTO shaft being disposed on said main shifting device side.

2. The power transmission device as claimed in claim 1, wherein said first main shifting shaft, second main shifting shaft and front-wheel drive shaft are arranged side by side at approximately the same height.

3. A power transmission device for a tractor including a main shifting device and a secondary shifting device arranged in front-to-back longitudinally spaced relation within a transmission case mounted on a rear part of the tractor body, and drive means drivingly connecting an axle including an engine, speed change means and a differential apparatus having an input gear driven by a drive gear, said power transmission comprising:

a longitudinally-extending first main shifting shaft disposed in said main shifting device and extending to said secondary shifting device; a second main shifting shaft disposed in said main shifting device in parallel with said first main shifting shaft; said differential apparatus being disposed between said main shifting device and said secondary shifting device adjacent to a side wall of said transmission case adjacent said input gear; a differential shaft extending transversely from said differential apparatus perpendicularly with respect to said first main shifting shaft; and a secondary shifting shaft disposed in said secondary shifting device in parallel with said first main shifting shaft; one end portion of said second main shifting shaft extending into a space formed around said differential shaft on the side of said differential apparatus opposite to said transmission case side wall, and said one end portion extending into said space to transversely overlap said input gear.

4. The power transmission device as claimed in claim 3, wherein said one end portion of at least one of said shifting shafts is supported by a stationary wall portion which is provided within said space, secured to said transmission case and makes a right angle with said shifting shaft, and said stationary wall portion and said shifting shaft are each formed with an oil passage, said oil passages communicating with each other at the end portion of said shifting shaft.

5. A power transmission apparatus for a tractor including a main shifting device and a secondary shifting device arranged in front-to-back longitudinally spaced relation in a transmission case mounted on a rear part o the tractor body, and driver power, transmitted from an engine, changed in speed and transmitted to an axle through a differential shaft disposed between said main shifting device and said secondary shifting device, a differential apparatus having an input gear disposed adjacent a side wall of said transmission case, a shifting shaft mounted on at least one of said main shifting device and said secondary shifting device having one end portion extending in laterally overlapped relation to said input gear into a space formed between said transmission case side wall and the a side of said differential shaft opposite said input gear, said end portion of said shifting shaft disposed in said space and connecting a stationary wall portion of said transmission case, and said stationary wall portion and said shifting shaft each being formed with oil passages that are mutually communicating at said end portion of said shifting shaft.

* * * * *